(No Model.)
J. M. LINGLE.
VEHICLE HUB.
No. 408,730. Patented Aug. 13, 1889.
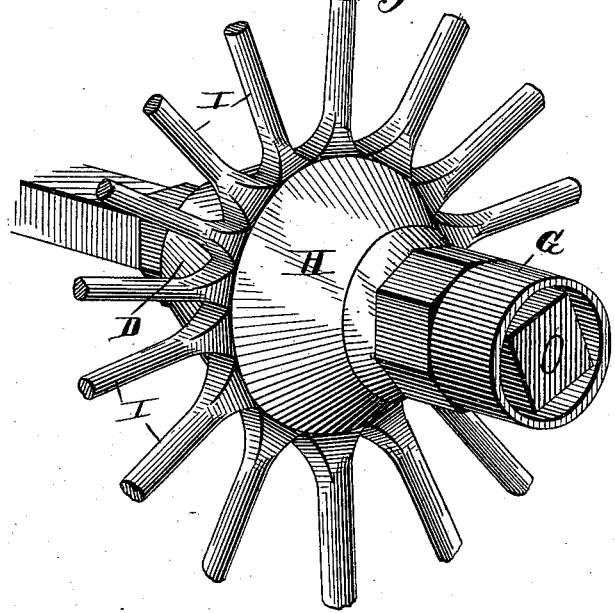
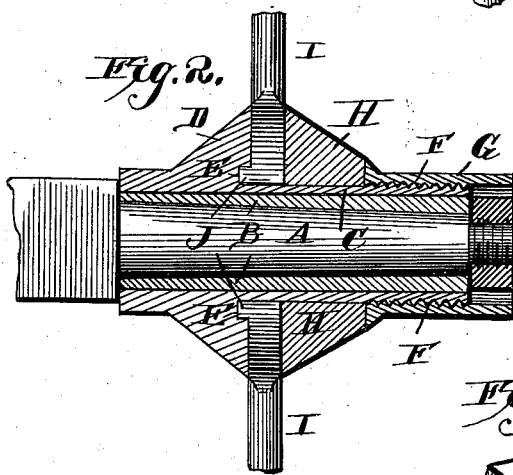
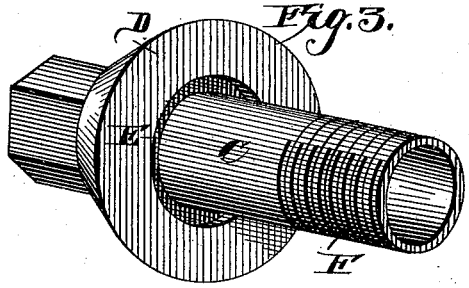
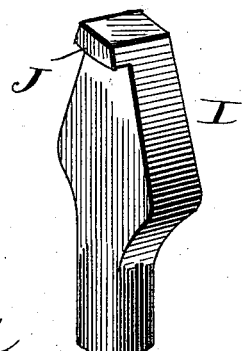
Witnesses
Henry G. Dieterich
R. W. Bishop
Inventor
John M. Lingle,
By his Attorneys,
C. A. Snow & Co.

UNITED STATES PATENT OFFICE.

JOHN M. LINGLE, OF SEDALIA, MISSOURI, ASSIGNOR OF ONE-HALF TO P. F. BRASHEAR, OF SAME PLACE.

VEHICLE-HUB.

SPECIFICATION forming part of Letters Patent No. 408,730, dated August 13, 1889.

Application filed May 17, 1889. Serial No. 311,122. (No model.)

*To all whom it may concern:*

Be it known that I, JOHN M. LINGLE, a citizen of the United States, residing at Sedalia, in the county of Pettis and State of Missouri, have invented a new and useful Vehicle-Hub, of which the following is a specification.

My invention relates to improvements in hubs; and it consists in certain novel features hereinafter described and claimed.

In the accompanying drawings, Figure 1 is a perspective view of my improved hub. Fig. 2 is a longitudinal vertical section of the same. Fig. 3 is a perspective view of the stationary member, and Fig. 4 is a detail perspective view of the end of one of the spokes.

The spindle A and the boxing B may be of the usual or any preferred construction. Upon the boxing I secure the sleeve C, provided near its inner end with the annular flange D, and the said flange is provided on its outer side with the annular groove E. The free end of the sleeve C is threaded, as shown at F, and on this threaded portion I mount the sliding collar G. In advance of the collar G, I arrange on the sleeve C a ring H, having a flat inner face, which is adapted to be pressed against the ends of the spokes by the said collar G. The spokes I are provided at their ends with the lips J, which are adapted to engage the groove E.

In practice the spokes are arranged around the sleeve C, with their inner ends bearing thereon and the lips J engaging the grooves E. The ring H is then pushed up against the ends of the spokes and the sliding collar G then turned home against the said ring, so that the spokes will be clamped between the said ring and the flange D. The spokes will thus be effectually secured, as the threaded connection of the collar G with the sleeve C prevents its accidentally loosening so as to allow the spokes to move laterally, and the lips J, engaging the groove E, prevent the spokes moving radially from the hub.

My device is very simple in its construction, and the several parts are very compactly arranged, so that I have provided a hub which will possess great strength and durability and can be manufactured at a slight cost.

Having described my invention, what I claim, and desire to secure by Letters Patent, is—

The combination of the cylindrical sleeve C, fitted on the axle and provided at its inner end with an annular plain-faced flange D, the said flange having an annular groove E at the angle of the flange and the sleeve, the spokes having their inner ends resting on the sleeve and provided with lateral lips engaging the said groove E, the smooth-faced ring loosely mounted on the outer end of the sleeve and bearing against the spokes, and the collar secured on the sleeve and bearing against the ring, so as to cause the said ring to clamp the spokes against the annular flange, as specified.

In testimony that I claim the foregoing as my own I have hereto affixed my signature in presence of two witnesses.

JOHN M. LINGLE.

Witnesses:
JNO. D. CRAWFORD,
A. P. MOREY.